UNITED STATES PATENT OFFICE.

CLAUS NISSEN RIIBER, OF CHRISTIANIA, NORWAY, ASSIGNOR TO AKTIESELSKABET DET NORSKE KVAELSTOFKOMPAGNI, OF CHRISTIANIA, NORWAY.

METHOD OF PRODUCTION OF NITRITES.

No. 899,705.  Specification of Letters Patent.  Patented Sept. 29, 1908.

Application filed January 6, 1905. Serial No. 239,921.

*To all whom it may concern:*

Be it known that I, CLAUS NISSEN RIIBER, a subject of the King of Norway and Sweden, residing at Christiania, Norway, have invented certain new and useful Improvements in the Methods of Production of Nitrites; and I do hereby declare the following to be a full, clear, and exact description of the invention, such as will enable others skilled in the art to which it appertains to make and use the same.

My invention relates to the production of nitrites and consists in an improved method of production of nitrites by which a simultaneous forming of nitrates is prevented.

Nitrous gases obtained by nitrification of air usually are absorbed by alkaline liquids, but the experience is that the resulting products are not pure nitrites, but a mixture of nitrites and nitrates, which mixture is very difficult to transform into useful and marketable products. This result seems to have been caused by the fact that it has been usual to let the gases undergo, before absorption, an oxidation from nitric oxid (NO) to nitrogen dioxid ($NO_2$) or at least to a mixture of nitric oxid (NO) and nitrogen dioxid ($NO_2$), and such mixture cannot give pure nitrites with alkalies. The reason why the gases have been treated in this manner is, that it has been thought impossible to obtain a reaction between nitric oxid (NO) and alkalies, and this is true in so far as pure nitric oxid (NO) and alkalies do not combine.

I have discovered that when nitric oxid (NO) mixed with oxygen or with air is brought into contact with alkalies, a reaction will take place, and that in this instance pure nitrite, free from nitrate, is obtained. My experiments have, moreover, shown that a reaction between nitric oxid and alkalies or alkaline earths, (by which reaction nitrite is formed in the presence of oxygen,) will take place according to the following equation:

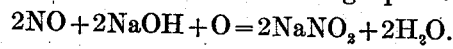

$$2NO + 2NaOH + O = 2NaNO_2 + 2H_2O.$$

From this it will be seen that a practical production of nitrite free from nitrates from gas mixtures containing nitric oxid, as those produced in electric furnaces, is possible.

According to my invention the process is performed as follows:—The gases from the electric furnace are at once directed into absorption apparatus containing alkalies or alkaline earths, and before the oxidation of the nitric oxid (NO) to nitrogen dioxid ($NO_2$) takes place, which agents will act upon the nitric oxid before the oxygen has been able to convert the oxid into dioxid. If the gases in leaving the furnace are very warm it may be advantageous to cool said gases considerably as they leave the furnace, whereby the reaction between the oxygen and the nitric oxid is retarded.

I claim—

1. In the manufacture of nitrites, the process which consists in treating air in an electric arc, thereby forming a mixture of nitric oxid with an excess of air, and causing said gases, before nitric oxid is changed to a higher oxid, to act upon an alkaline solution to form an alkaline nitrite, substantially as and for the purpose set forth.

2. In the manufacture of pure nitrites, the process which consists in blowing air through an electric arc in a suitable furnace and leading the gas mixture so formed directly into compounds of alkalies or alkaline earths contained in a chamber separate from the furnace.

3. In the manufacture of nitrites, the process which consists in treating air in an electric arc, thereby forming a mixture of nitric oxid with an excess of air, then cooling the gases and causing them to act upon an alkaline solution before nitric oxid is changed to higher oxid of nitrogen to form a substantially pure alkaline nitrite.

In testimony that I claim the foregoing as my invention, I have signed my name in presence of two subscribing witnesses.

CLAUS NISSEN RIIBER.

Witnesses:
HENRY BORDEWICH,
MICHAEL ALGER.